United States Patent
Hattori et al.

(10) Patent No.: US 9,406,921 B2
(45) Date of Patent: Aug. 2, 2016

(54) PRISMATIC SECONDARY BATTERY

(75) Inventors: Takayuki Hattori, Kasai (JP); Takenori Kimura, Naruto (JP); Yasuhiro Yamauchi, Kasai (JP); Toshiyuki Nohma, Kobe (JP)

(73) Assignee: Sanyo Electric Co., Ltd., Daito-shi (JP)

( * ) Notice: Subject to any disclaimer, the term of this patent is extended or adjusted under 35 U.S.C. 154(b) by 340 days.

(21) Appl. No.: 13/880,765

(22) PCT Filed: Oct. 28, 2011

(86) PCT No.: PCT/JP2011/074978
§ 371 (c)(1),
(2), (4) Date: Apr. 22, 2013

(87) PCT Pub. No.: WO2012/057335
PCT Pub. Date: May 3, 2012

(65) Prior Publication Data
US 2013/0209849 A1 Aug. 15, 2013

(30) Foreign Application Priority Data
Oct. 29, 2010 (JP) ................................. 2010-244607

(51) Int. Cl.
H01M 2/26 (2006.01)
H01M 2/02 (2006.01)

(52) U.S. Cl.
CPC ............... *H01M 2/26* (2013.01); *H01M 2/263* (2013.01); *H01M 2/266* (2013.01); *H01M 2/0217* (2013.01)

(58) Field of Classification Search
CPC ..................................................... H01M 2/263
USPC ............................................................ 429/94
See application file for complete search history.

(56) References Cited

U.S. PATENT DOCUMENTS

| 7,736,797 B2 | 6/2010 | Kim et al. |
| 2002/0061438 A1 | 5/2002 | Inoue et al. |

(Continued)

FOREIGN PATENT DOCUMENTS

| CN | 1893160 A | 1/2007 |
| EP | 2337106 A2 | 6/2011 |

(Continued)

OTHER PUBLICATIONS

Chinese Office Action dated Nov. 15, 2014, issued in corresponding Chinese Patent Application No. 201180050058.1, w/English translation (11 pages).

(Continued)

*Primary Examiner* — Basia Ridley
*Assistant Examiner* — James Erwin
(74) *Attorney, Agent, or Firm* — Westerman, Hattori, Daniels & Adrian, LLP

(57) ABSTRACT

A prismatic secondary battery is provided with a negative/positive electrode collector (18), which are disposed on either one of a wound negative/positive electrode substrate exposed portion (15), and a negative/positive electrode collector receiving member (19) which is disposed on another surface. At least one of the negative/positive electrode collector has a recess portion (30) formed in part on a surface on the side not facing the negative/positive electrode substrate exposed portions so as to be thinner than the thickness of the other portion. Resistance welding is carried out in this recessed part, thereby a large welding nugget is formed between the negative/positive electrode exposed portion and the negative/positive electrode collector.

16 Claims, 11 Drawing Sheets

(56) References Cited

U.S. PATENT DOCUMENTS

| | | |
|---|---|---|
| 2006/0051664 A1 | 3/2006 | Tasai et al. |
| 2006/0115722 A1* | 6/2006 | Kim ............... 429/161 |
| 2007/0009793 A1 | 1/2007 | Kim et al. |
| 2007/0105015 A1 | 5/2007 | Munenaga et al. |
| 2007/0117009 A1* | 5/2007 | Yamauchi et al. ......... 429/160 |
| 2010/0081051 A1 | 4/2010 | Taniguchi et al. |
| 2010/0233521 A1* | 9/2010 | Byun ............ H01M 2/263 429/72 |
| 2011/0123855 A1 | 5/2011 | Kim et al. |
| 2011/0195286 A1 | 8/2011 | Aota et al. |

FOREIGN PATENT DOCUMENTS

| | | |
|---|---|---|
| JP | 61-16863 A | 1/1986 |
| JP | 2003-249423 A | 9/2003 |
| JP | 2007-019017 A | 1/2007 |
| JP | 2009-238604 A | 10/2009 |
| JP | 2010-073408 A | 4/2010 |
| JP | 2010-086688 A | 4/2010 |
| JP | 2011-165437 A | 8/2011 |
| KR | 100637443 B1 | 10/2006 |

OTHER PUBLICATIONS

International Search Report of PCT/JP2011/074978 mailing date Jan. 31, 2012.
Notification of Transmittal of Translation of the International Preliminary Report on Patentability (Forms PCT/IB/326) of International Application No. PCT/JP2011/074978 mailed May 23, 2013 with Forms PCT/IB/373, PCT/IB/338 and PCT/ISA/237.
Extended European Search Report dated Nov. 27, 2014, issued in corresponding European Patent Application No. 11836468.6 (7 pages).

* cited by examiner

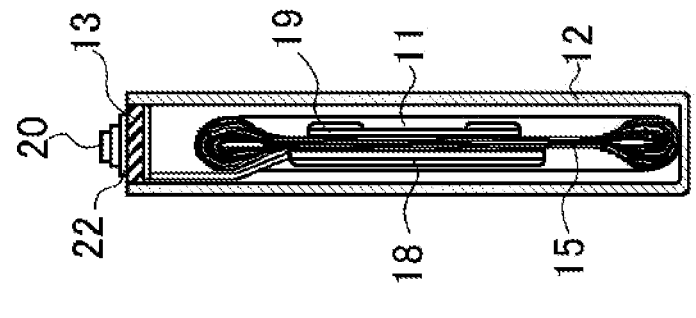
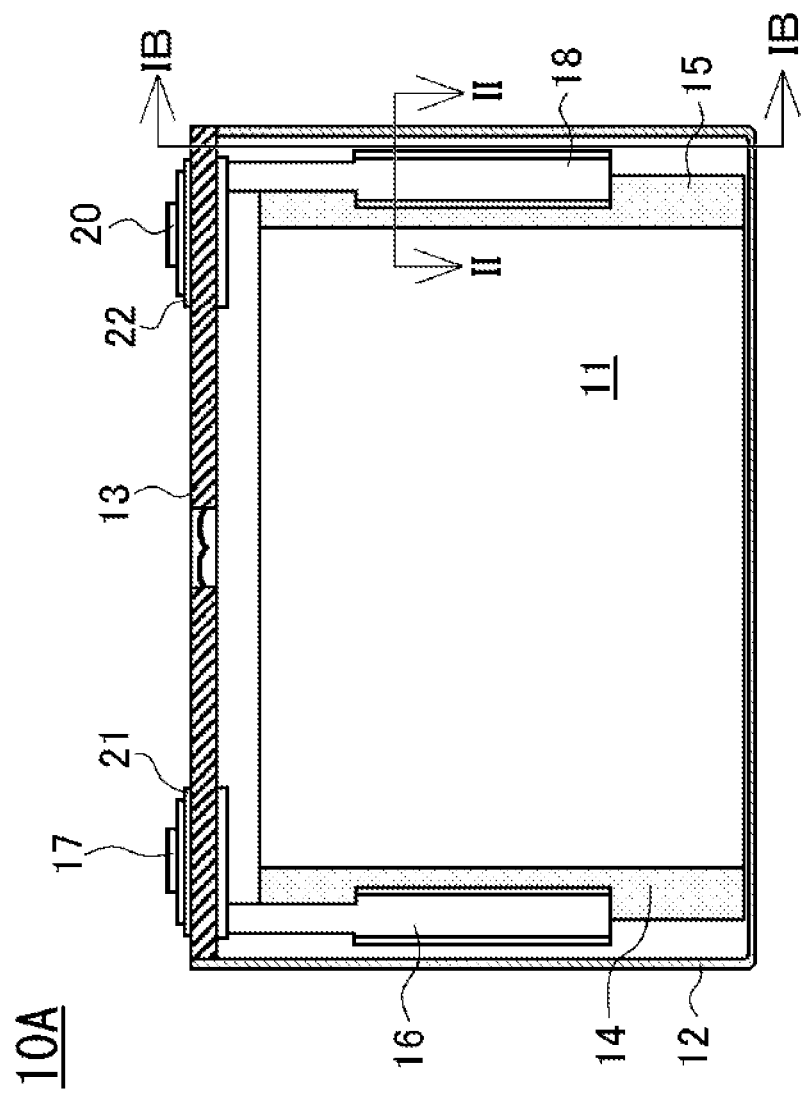

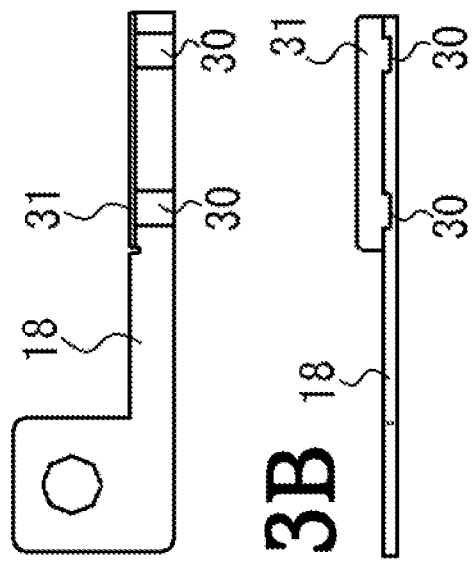
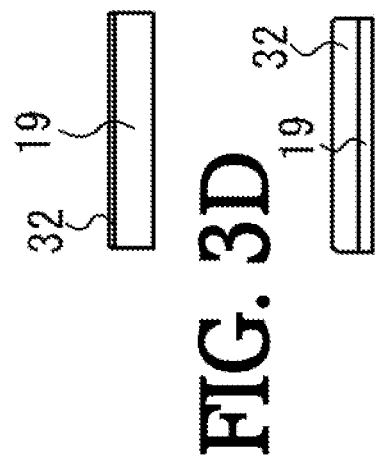
FIG. 3A  FIG. 3B  FIG. 3C  FIG. 3D

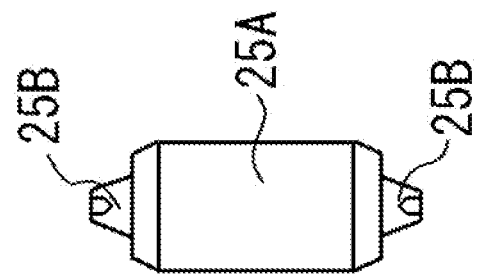
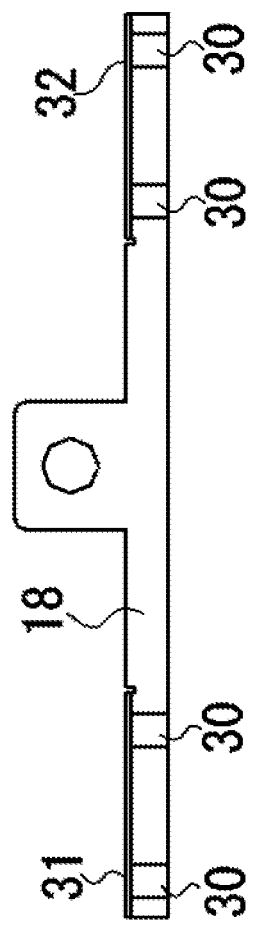
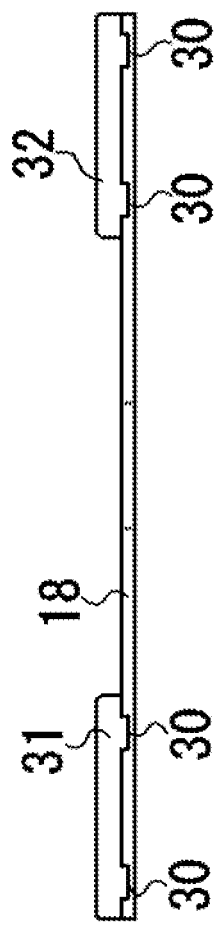

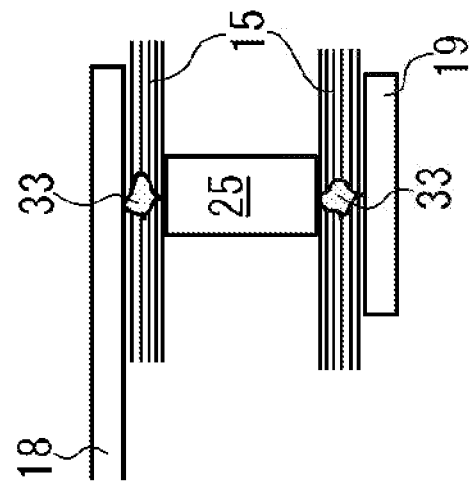
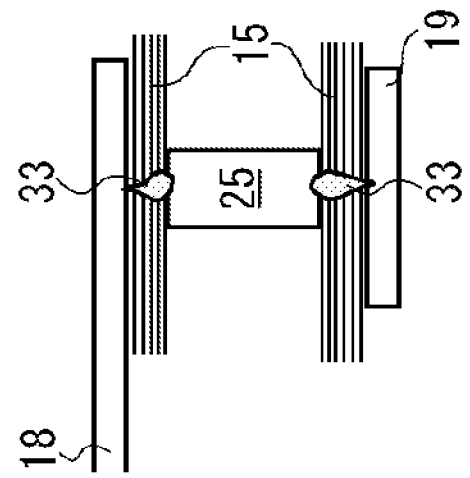
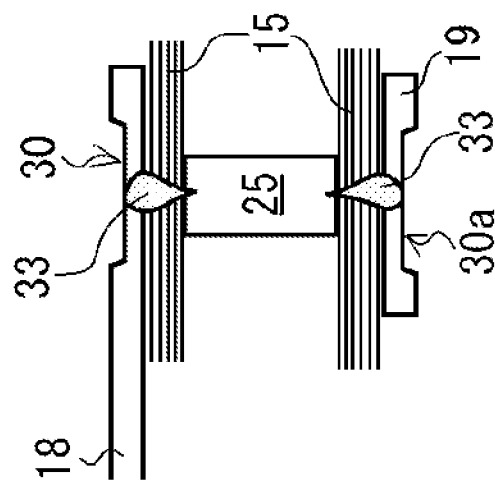
FIG. 8A
FIG. 8B (RELATED ART)
FIG. 8C (RELATED ART)

PRISMATIC SECONDARY BATTERY

TECHNICAL FIELD

The present invention relates to a prismatic secondary battery including a collector resistance-welded to stacked positive electrode substrate exposed portions or negative electrode substrate exposed portions. With the prismatic secondary battery, a large welding trace (nugget) formed inside the stacked positive electrode substrate exposed portions or negative electrode substrate exposed portions is formed stably on the collector side, the internal resistance between the collector and the positive electrode substrate exposed portions or negative electrode substrate exposed portions is low, and the weld strength is high.

BACKGROUND ART

Curbs on emissions of gases causing global warming such as carbon dioxide gas have been strengthened against a background of growing environmental protection movements. To address this, the car industry has been actively developing electric vehicles (EVs) and hybrid electric vehicles (HEVs) in place of automobiles using fossil fuels such as gasoline, diesel oil, and natural gas. Batteries used for such EVs and HEVs are generally nickel-hydrogen secondary batteries or lithium ion secondary batteries. In recent years, nonaqueous electrolyte secondary batteries such as a lithium ion secondary battery have been widely used because such a battery is lightweight and has high capacity.

Applications in EVs and HEVs require advancement not only in environmental responsiveness but also in basic performance as an automobile, specifically, running capability such as acceleration performance or hill climbing performance. To satisfy such requirements, not only a mere increase in battery capacity but also a high-power battery is necessary. Secondary batteries used for EVs and HEVs are generally prismatic secondary batteries accommodating a power-generating element within a prismatic outer can. Since a large current flows in the battery when a high-power discharge is performed, the internal resistance of the battery needs to be reduced as much as possible. Therefore, various improvements have also been made to prevent a poor weld between substrate exposed portions of an electrode plate and a collector in a power-generating element of a battery to reduce the internal resistance.

A mechanical fastening method, a welding method, and the like are examples of methods of electrically joining substrate exposed portions of an electrode plate and a collector in a power-generating element to collect power. The welding method is suitable as a collecting method for a battery requiring high power since it is easy to achieve reduction in resistance and temporal change is less likely to occur. Such resistance welding between substrate exposed portions of an electrode plate and a collector of a prismatic secondary battery is performed in a manner below.

For example, in a flattened wound electrode assembly 50 in which a positive electrode plate and a negative electrode plate are wound a plurality of times in a state insulated from each other with a separator therebetween as shown in FIG. 9, a negative electrode collector 52 containing copper or copper alloy is arranged on a surface on one side of a bunch of negative electrode substrate exposed portions 51 containing copper or copper alloy. A negative electrode collector receiving member 53 containing copper or copper alloy is arranged in the same manner on a surface on the other side. The negative electrode collector 52 and the negative electrode collector receiving member 53 are brought into abutment with resistance welding electrodes 54 and 55, respectively, thereby performing resistance welding. This leads to melting of a part of the bunch of negative electrode substrate exposed portions 51 located between a pair of the resistance welding electrodes 54 and 55, and thereby a nugget 56 is formed as appropriate. A favorable electrical conduction is thus achieved between the bunch of negative electrode substrate exposed portions 51 and the negative electrode collector 52 as well as the negative electrode collector receiving member 53.

Positive electrode substrate exposed portions, a positive electrode collector, and a positive electrode collector receiving member (which are omitted in the drawing) have configurations substantially similar to the negative electrode substrate exposed portions 51, the negative electrode collector 52, and the negative electrode collector receiving member 53, respectively, except that the formation material of each is aluminum or aluminum alloy. In this specification, the negative electrode collector or positive electrode collector indicates a member that is directly resistance-welded to the negative electrode substrate exposed portions or positive electrode substrate exposed portions and is used for electrically connecting the negative electrode substrate exposed portions or positive electrode substrate exposed portions to a negative electrode terminal or positive electrode terminal. The negative electrode collector receiving member or positive electrode collector receiving member refers to a member that is directly resistance-welded to the negative electrode substrate exposed portions or positive electrode substrate exposed portions and is used in combination with the negative electrode collector or positive electrode collector.

Patent Document 1 below shows a prismatic secondary battery in which a positive electrode collector or negative electrode collector is welded with a resistance welding method to a substrate exposed portion of a positive electrode plate or negative electrode plate of a flattened wound electrode assembly in which the positive electrode plate and the negative electrode plate are wound a plurality of times in a state insulated from each other with a separator therebetween. A prismatic secondary battery shown in Patent Document 1 below will be described using FIG. 10. FIG. 10A is a vertical sectional view of a terminal portion in the prismatic secondary battery disclosed in Patent Document 1 below, and FIG. 10B is a vertical sectional view of the same at the time of resistance welding.

In a prismatic secondary battery 60 shown in Patent Document 1 below, as shown in FIG. 10A, a wound electrode assembly 62 includes positive electrode substrate exposed portions (omitted in the drawing) and negative electrode substrate exposed portions 61 in which a positive electrode plate and a negative electrode plate are respectively wound in a state insulated from each other with a separator therebetween. The wound electrode assembly 62 is arranged within a prismatic battery outer can 63. For example, the negative electrode substrate exposed portions 61 are bundled in part. A negative electrode collector 64 is resistance-welded to one surface of the bunch of negative electrode substrate exposed portions 61. The negative electrode collector 64 is electrically connected to a negative electrode terminal 66 attached in an insulated state with respect to a sealing body 65 that is attached to hermetically seal a mouth portion of the prismatic battery outer can 63.

A resistance welding portion 64a of the negative electrode collector 64 is made thinner than other portions. As shown in FIG. 10B, one surface of the resistance welding portion 64a of the negative electrode collector 64 is brought into abutment with a surface on one side in a portion where the negative electrode substrate exposed portions 61 are bundled. One of a pair of resistance welding electrodes 67 is brought into abutment with the surface on another surface of the resistance welding portion 64a. The other of the pair of resistance welding electrodes 67 is brought into abutment with a surface on the other side of the bunch of negative electrode substrate exposed portions 61. A current for resistance welding is caused to flow between the pair of resistance welding electrodes 67, thereby performing resistance welding. An insulation tape 68 is attached on the resistance welding portion 64a side of the negative electrode collector 64 in order to prevent a short circuit at a portion other than the welding portion 64a of the negative electrode collector 64 with the negative electrode substrate exposed portions 61. With a nonaqueous electrolyte secondary battery shown in Patent Document 1 below, a nugget 69 is formed within the bunch of negative electrode substrate exposed portions 61, and a favorable electrical connection is achieved between the bunch of negative electrode substrate exposed portions 61 and the negative electrode collector 64.

[Patent Document 1] JP-A-2010-073408
[Patent Document 2] JP-UM-A-61-016863

DISCLOSURE OF INVENTION

Problem to be Solved by the Invention

An electrode assembly of a nonaqueous electrolyte secondary battery as a prismatic secondary battery for EVs and HEVs has a configuration in which a positive electrode plate and a negative electrode plate are stacked or wound with a separator therebetween. Substrate exposed portions of the positive electrode plate and the negative electrode plate are arranged to be located on different sides from each other. The substrate exposed portion of the positive electrode plate is stacked and welded to a positive electrode collector, and the substrate exposed portion of the negative electrode plate is stacked and welded to a negative electrode collector. The stacking numbers of the negative electrode substrate exposed portions and the positive electrode substrate exposed portions are extremely large in the case where the capacity of the nonaqueous electrolyte secondary battery as a prismatic secondary battery for EVs or HEVs is large. Therefore, there is still room for improvement in stably forming a favorable nugget between the negative electrode substrate exposed portions or positive electrode substrate exposed portions and the negative electrode collector or positive electrode collector with a resistance welding method.

The negative electrode collector or positive electrode collector needs a certain thickness in order to maintain mechanical strength and to be low in resistance. However, when the thickness of the negative electrode collector or positive electrode collector is large, it is hard to stably form a nugget between the negative electrode substrate exposed portions or positive electrode substrate exposed portions and the negative electrode collector or positive electrode collector, since it is hard to generate heat at a welding portion upon resistance welding. Otherwise, only a small nugget would be formed. Therefore, there has been a problem that an electrical path cannot be ensured reliably between the negative electrode substrate exposed portions or positive electrode substrate exposed portions and the negative electrode collector or positive electrode collector.

When the whole of the negative electrode collector or positive electrode collector is made thin, it is easier to form a nugget since the negative electrode collector or positive electrode collector is more easily melted with low energy. However, there is also a problem of a decrease in sealing properties due to insufficient fastening caused by deformation of the collector at a fastening portion for each terminal and the collector or a decrease in vibration resistance due to the electrode assembly being more likely to move due to insufficient joint strength of a sealing body and the electrode assembly.

Furthermore, when the entire thickness of a region where the negative electrode collector or positive electrode collector is in abutment with the negative electrode substrate exposed portions or positive electrode substrate exposed portions is made smaller than the thickness of the other portions as shown in Patent Document 1 above, it is easier to form a nugget since a resistance welding portion is more easily melted with low energy. However, the sectional area of the region where the negative electrode collector or positive electrode collector is in abutment with the negative electrode substrate exposed portions or positive electrode substrate exposed portions is smaller than the sectional area of the other portions. This leads to a problem that an increase in resistance (decrease in output) occurs and a disconnection easily occurs at a portion where a step in thickness is formed due to vibration or the like.

As a result of conducting various experiments to solve the problem of the related art described above, the inventors have found that a large nugget can be formed stably within a substrate exposed portions in the vicinity of the collector by forming, in a region in which a collector faces each substrate exposed portion, a recess portion in part on a surface of the collector on the side not facing the substrate exposed portions, forming the thickness of the recess portion to be smaller than the thickness of the other portions, and carrying out resistance welding at the recess portion. Thus, the present invention has been completed.

That is, the present invention provides a prismatic secondary battery in which a collector, many substrate exposed portions, a collector receiving member, and other components are resistance-welded reliably while using the collector with a large thickness.

As shown in FIG. 11, Patent Document 2 above shows an example of a flattened battery 70 with a lead terminal. In the flattened battery 70, in a region where a lead terminal 71 is in abutment with one electrode terminal 72, a recess portion 73 is formed in part on a surface of the lead terminal 71 on the side not in abutment with the electrode terminal 72. The thickness of the recess portion 73 is formed to be smaller than the thickness of the other portions, and resistance welding is carried out in the recess portion 73. Patent Document 2, however, shows nothing regarding resistance welding of the lead terminal to many negative electrode substrate exposed portions or positive electrode substrate exposed portions. FIG. 11A is a perspective view of the flattened battery with a lead terminal shown in Patent Document 2 above, FIG. 11B is a perspective view of a first specific example of the lead terminal, and FIG. 11C is a perspective view of a second specific example of the same.

Means for Solving Problem

To achieve the object described above, a prismatic secondary battery of the present invention includes the following: an electrode assembly including stacked or wound negative electrode substrate exposed portions and positive electrode substrate exposed portions; a negative electrode collector and a positive electrode collector electrically connected to the negative electrode substrate exposed portions and the positive electrode substrate exposed portions, respectively; and a negative electrode terminal and a positive electrode terminal electrically connected to the negative electrode collector and the positive electrode collector, respectively. In the prismatic secondary battery, at least one of the negative electrode substrate exposed portions and the positive electrode substrate exposed portions has one surface with the negative electrode collector or the positive electrode collector arranged and another surface with a negative electrode collector receiving member or a positive electrode collector receiving member arranged. At least one of the negative electrode collector and the positive electrode collector has a recess portion formed in part on a surface on the side not facing the negative electrode substrate exposed portions or the positive electrode substrate exposed portions in a region facing the negative electrode substrate exposed portions or the positive electrode substrate exposed portions. The thickness of the recess portion is formed to be smaller than the thickness of the other portions. Resistance welding is carried out in the recess portion.

The term "prismatic secondary battery" in the invention is used to refer not only to a nonaqueous electrolyte secondary battery represented by a lithium-ion secondary battery but also an aqueous electrolyte secondary battery such as a nickel-metal-hydride secondary battery.

In the prismatic secondary battery of the invention, at least one of the negative electrode collector and the positive electrode collector has the recess portion in part on the surface on the side not facing the negative electrode substrate exposed portions or the positive electrode substrate exposed portions in the region opposing the negative electrode substrate exposed portions or the positive electrode substrate exposed portions. In addition, the thickness of the recess portion is formed to be smaller than the thickness of the other portions, and resistance welding is carried out in the recess portion. Therefore, the recess portion of the collector easily generates heat upon resistance welding even if the thickness of the negative electrode collector and the positive electrode collector is large. This leads to a large nugget stably formed on the negative electrode collector side or the positive electrode collector side inside the stacked negative electrode substrate exposed portions or the positive electrode substrate exposed portions. This increases the weld strength between the negative electrode substrate exposed portions or positive electrode substrate exposed portions, and the negative electrode collector or positive electrode collector, and ensures an electrical path reliably, thus increasing the reliability of a resistance welding portion.

Moreover, the thickness of the negative electrode collector or the positive electrode collector can be made thick. This prevents a decrease in sealing properties due to deformation of each collector that is easily caused in the case where the thickness of the negative electrode collector or the positive electrode collector is made small in a fixed portion of the negative electrode terminal or positive electrode terminal and the negative electrode collector or positive electrode collector. In addition, the negative electrode collector or positive electrode collector is fixed securely to the negative electrode terminal or positive electrode terminal. This prevents an electrode assembly from moving due to external vibration or the like, and also prevents the negative electrode collector or the positive electrode collector from being deformed, leading to a favorable vibration resistance.

In addition, the recess portion as the resistance welding portion is formed in part at the negative electrode collector or the positive electrode collector. Thus, the negative electrode collector or positive electrode collector is made such that the thickness does not vary between a portion facing the negative electrode substrate exposed portions or positive electrode substrate exposed portions and other portions. This prevents the negative electrode collector or the positive electrode collector from being disconnected even if external vibration or the like is applied.

In the prismatic secondary battery of the invention, adjusting the thickness of a recessing process portion upon providing the recess portion to the collector reduces unevenness in the thickness of a welded part of the collector, compared to a case where a collector obtained by punching a metal sheet is directly used. Thus, welding can be performed stably upon resistance welding, and a prismatic secondary battery with an increased reliability in the resistance welding portion can be obtained. The collector and the collector receiving member of the invention may be provided to either one or both of the negative electrode substrate exposed portions and the positive electrode substrate exposed portions. The shape of the recess portion in the prismatic secondary battery of the invention is not particularly limited, and any desired shape such as a quadrangle, a polygon, or a circle may be employed. A side wall surface of the recess portion may be an inclined surface. Furthermore, an insulating film may be arranged between the substrate exposed portions and the collector or collector receiving member except at the resistance welding portion. The collector or collector receiving member may be formed with a projection on the side facing the substrate exposed portion.

In the prismatic secondary battery of the invention, it is preferable that the thickness of the recess portion be smaller than the thickness of the negative electrode collector receiving member or the positive electrode collector receiving member.

When the thickness of the recess portion formed in the negative electrode collector or the positive electrode collector is made smaller than the thickness of the negative electrode collector receiving member or the positive electrode collector receiving member, a large nugget is formed in the negative electrode substrate exposed portions or positive electrode substrate exposed portions by resistance welding on the side of the negative electrode collector or positive electrode collector. Therefore, with the prismatic secondary battery of the invention, the weld strength is increased between the negative electrode collector or positive electrode collector and the negative electrode substrate exposed portions or positive electrode substrate exposed portions, and the electrical resistance is decreased. Therefore, a reduction in output at the time of a large current discharge is decreased.

In the prismatic secondary battery of the invention, at least one of the negative electrode substrate exposed portions and the positive electrode substrate exposed portions may be divided into two groups with an intermediate member including at least one conductive member arranged therebetween. The collector and the collector receiving member on the divided substrate exposed portion side may be arranged on each surface on the outermost side of the divided substrate exposed portions.

In that case, at least one of the stacked negative electrode substrate exposed portions or positive electrode substrate exposed portions is divided into two groups; the collector and the collector receiving member are arranged on each of both surfaces on the outermost side of the divided substrate exposed portions; and the intermediate member including at least one conductive member is arranged between two bunches of the substrate exposed portions. This reduces the number of layers of each bunch of the substrate exposed portions, thereby enabling resistance welding to be performed in a favorable manner inside the substrate exposed portions on each side. Moreover, such an intermediate member generates, at the time of resistance welding, a flow from the collector or collector receiving member, to the substrate exposed portions, the conductive member, the substrate exposed portions, and then to the collector or collector receiving member. This enables resistance welding to be performed simultaneously for the negative electrode substrate exposed portions or positive electrode substrate exposed portions and the collector as well as the collector receiving member through one resistance welding. Moreover, a large nugget is formed on the collector side. This increases the weld strength between the negative electrode collector or positive electrode collector and the negative electrode substrate exposed portions or positive electrode substrate exposed portions, and reduces the electrical resistance. Thus, a reduction in output at the time of a large current discharge is decreased.

In the prismatic secondary battery of the invention, the collector receiving member may be formed with a recess portion in a part of a surface on the side not facing the divided substrate exposed portions in a region facing the divided substrate exposed portions. The thickness of the recess portion is formed to be smaller than the thickness of the other portions. Resistance welding is carried out in the recess portion.

In that case, the intermediate member is arranged between the two bunches of the substrate exposed portions, the collector and the collector receiving member arranged on both surfaces on the outermost side of the divided substrate exposed portions have the recess portion on the surface on the side not facing the divided substrate exposed portions in the region not facing the divided substrate exposed portions, the thickness of the recess portion is formed to be smaller than the thickness of the other portions, and resistance welding is carried out in the recess portions. The recess portion of the collector and the recess portion of the collector receiving member more easily generate heat than the conductive member at the time of resistance welding. This leads to a large nugget stably formed on the collector side and the collector receiving member side within the divided substrate exposed portions. This increases the weld strength between the negative electrode substrate exposed portions or positive electrode substrate exposed portions and the negative electrode collector or positive electrode collector and between the negative electrode substrate exposed portions or positive electrode substrate exposed portions and the negative electrode collector receiving member or positive electrode collector receiving member, and ensures an electrical path reliably, thus increasing the reliability of the resistance welding portion.

In the prismatic secondary battery of the invention, the conductive member of the intermediate member may be formed with a projection on the side that contacts the negative electrode substrate exposed portions or the positive electrode substrate exposed portions.

When the conductive member is formed with the projection on the side that contacts the negative electrode substrate exposed portions or the positive electrode substrate exposed portions, the current is concentrated on this projection portion at the time of resistance welding and heat is easily generated. Therefore, a large nugget is formed each within one of the divided substrate exposed portions that is located between the collector and the intermediate member and within the other of the divided substrate exposed portions located between the collector receiving member and the intermediate member. This further increases the strength of the resistance welding portion, and a prismatic secondary battery with a smaller reduction in output at the time of a large current discharge can be obtained.

Furthermore, to achieve the object described above, a prismatic secondary battery of the invention includes the following: an electrode assembly including stacked or wound negative electrode substrate exposed portions and positive electrode substrate exposed portions; a negative electrode collector and a positive electrode collector electrically connected to the negative electrode substrate exposed portions and the positive electrode substrate exposed portions, respectively; and a negative electrode terminal and a positive electrode terminal electrically connected to the negative electrode collector and the positive electrode collector, respectively. In the prismatic secondary battery, at least one of the negative electrode collector and the positive electrode collector is formed integrally and arranged on both surfaces of the negative electrode substrate exposed portions or the positive electrode substrate exposed portions. At least one of the negative electrode collector and the positive electrode collector has a recess portion formed on both surfaces on the side not facing the negative electrode substrate exposed portions or the positive electrode substrate exposed portions in a region facing the negative electrode substrate exposed portions or the positive electrode substrate exposed portions. The thickness of the recess portion is formed to be smaller than the thickness of the other portions. Resistance welding is carried out in the recess portion.

In the prismatic secondary battery of the invention, at least one of the negative electrode collector and the positive electrode collector is formed integrally and arranged on two surfaces of the negative electrode substrate exposed portions or the positive electrode substrate exposed portions and the recess portion is formed on both surfaces on the side not facing the negative electrode substrate exposed portions or the positive electrode substrate exposed portions in the region facing the negative electrode substrate exposed portions or the positive electrode substrate exposed portions; the thickness of the recess portion is formed to be smaller than the other portions; and resistance welding is carried out in the recess portion. Therefore, the recess portion of the collector easily generates heat upon resistance welding even if the thickness of the negative electrode collector and the positive electrode collector is large. This leads to a large nugget stably formed on the negative electrode collector side or positive electrode collector side inside the negative electrode substrate exposed portions or the positive electrode substrate exposed portions. This increases the weld strength between the negative electrode substrate exposed portions or positive electrode substrate exposed portions and the negative electrode collector or positive electrode collector, and ensures an electrical path reliably, thus increasing the reliability of a resistance welding portion.

Moreover, the thickness of the negative electrode collector or positive electrode collector can be made large. This increases the strength of a fixed portion of the negative electrode terminal or positive electrode terminal and the negative electrode collector or positive electrode collector, consequently preventing a decrease in sealing properties due to deformation of the negative electrode collector or positive electrode collector that easily occurs in the case where the thickness of the negative electrode collector or positive electrode collector is made small. Moreover, the negative electrode collector or positive electrode collector is fixed securely to the negative electrode terminal or positive electrode terminal. This prevents deformation of the negative electrode collector or positive electrode collector by external vibration or the like, resulting in a favorable vibration resistance.

Moreover, the recess portion as the resistance welding portion is formed in part at the negative electrode collector or the positive electrode collector. In addition, the negative electrode collector or positive electrode collector is made such that the thickness does not vary between a portion facing the negative electrode substrate exposed portions or positive electrode substrate exposed portions and other portions. This prevents the negative electrode collector or positive electrode collector from being disconnected even if external vibration or the like is applied. Also in this case, an insulating film may be arranged between the substrate exposed portions and the collector except at the resistance welding portion. The collector may be formed with a projection on the side facing the substrate exposed portions.

In the prismatic secondary battery of the invention, at least one of the negative electrode substrate exposed portions and the positive electrode substrate exposed portions may be divided into two groups with an intermediate member including at least one conductive member arranged therebetween. The collector on the divided substrate exposed portion side is arranged on both surfaces on the outermost side of the divided substrate exposed portions.

In that case, at least one of the stacked negative electrode substrate exposed portions or positive electrode substrate exposed portions are divided into two groups. The collector is arranged on both surfaces on the outermost side of the divided substrate exposed portions. The intermediate member including at least one conductive member is arranged between the two bunches of the substrate exposed portions. Therefore, since the number of layers of each bunch of the substrate exposed portions is small, resistance welding is performed in a favorable manner inside the substrate exposed portions on each side. Moreover, such an intermediate member generates, at the time of resistance welding, a flow from one collector, the substrate exposed portions, the conductive member, the substrate exposed portions, and then to the other collector. This enables resistance welding to be performed simultaneously for the negative electrode substrate exposed portions or positive electrode substrate exposed portions and the collector as well as the collector receiving member in one attempt of the resistance welding.

In the prismatic secondary battery of the invention, the intermediate member is arranged between the two bunches of the substrate exposed portions. The collector arranged on both surfaces on the outermost side of the divided substrate exposed portions is formed with a recess portion on the surface on the side not facing the divided substrate exposed portions in the region facing the divided substrate exposed portions. The thickness of the recess portions is formed to be smaller than the thickness of the other portions, and resistance welding is carried out in the recess portions. The recess portion of the collector generates heat more easily than the conductive member at the time of resistance welding. This leads to a large nugget stably formed on the collector side on both sides within the divided substrate exposed portion. This increases the weld strength between the negative electrode substrate exposed portions or positive electrode substrate exposed portions and the negative electrode collector or positive electrode collector, and ensures an electrical path reliably, thus increasing the reliability of a resistance welding portion.

In the prismatic secondary battery of the invention, the conductive member of the intermediate member may be formed with a projection on a side that contacts the negative electrode substrate exposed portions or the positive electrode substrate exposed portions.

When the conductive member is formed with the projection on the side that contacts the negative electrode substrate exposed portions or the positive electrode substrate exposed portions, heat is easily generated in this projection portion at the time of resistance welding since current is concentrated. This leads to a large nugget formed within each the divided substrate exposed portions that are each located between the collectors on both sides and the intermediate member. This increases the strength of the resistance welding portion, and a prismatic secondary battery with a smaller reduction in output at the time of a large current discharge can be obtained.

BRIEF DESCRIPTION OF DRAWINGS

FIG. 1A is a front view showing the internal structure of a prismatic nonaqueous electrolyte secondary battery common to an example and a comparative example, and FIG. 1B is a sectional view along line IB-IB in FIG. 1A.

FIG. 3A is a plan view of a negative electrode collector before bending in Example 1, FIG. 3B is a side view of the same, FIG. 3C is a plan view of a negative electrode collector receiving member, and FIG. 3D is a side view of the same.

FIG. 6A is a plan view of a negative electrode collector before bending in Example 2, FIG. 6B is a side view of the same, and FIG. 6C is a plan view of a negative electrode conductive member.

FIG. 8A is a sectional view showing the formation state of a nugget in Example 3, and FIG. 8B and FIG. 8C are sectional views showing the formation state of a nugget in Comparative Example 3.

BEST MODE(S) FOR CARRYING OUT THE INVENTION

An embodiment of the present invention will be described below with reference to the drawings for both examples and comparative examples. Each example shown below exemplifies a prismatic nonaqueous electrolyte secondary battery as a prismatic secondary battery for embodying the technical idea of the present invention, and is not intended to specify the present invention as this prismatic nonaqueous electrolyte secondary battery. The present invention can be adapted equally to other embodiments included in the scope of claims such as a prismatic secondary battery using an aqueous electrolyte, for example, a nickel-metal-hydride secondary battery or nickel-cadmium secondary battery.

An electrode assembly that can be used in the present invention has a flattened shape in which a positive electrode plate and a negative electrode plate are wound or stacked with a separator therebetween, thus forming stacked positive electrode substrate exposed portions and stacked negative electrode substrate exposed portions at both end portions. A wound electrode assembly will be described below as an illustration. Furthermore, in the flattened wound electrode assembly common to respective examples and comparative examples, collectors, collector receiving members, and conductive members of an intermediate member for a negative electrode and a positive electrode may be substantially the same in structure although the formation materials differ. Moreover, the resistance welding method for each is substantially similar. Therefore, those on the negative electrode plate side will be described below as an illustration.

Example 1 and Comparative Example 1

Figure 2:
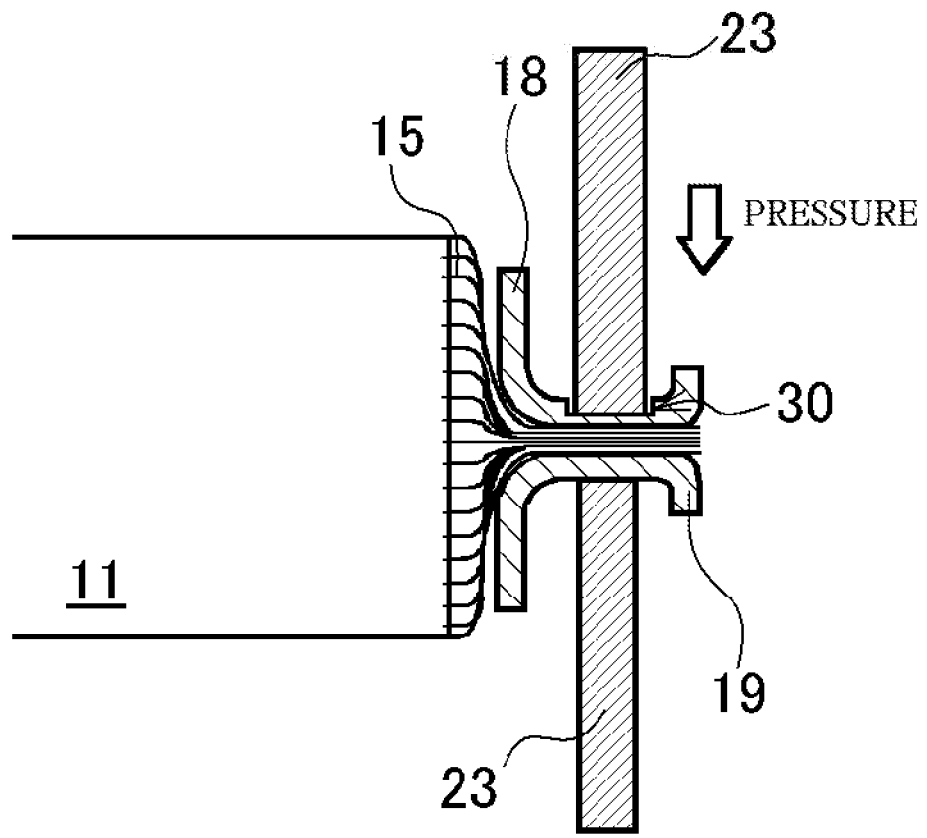
FIG. 2 is a sectional view of a portion along line II-II in FIG. 1A for illustrating a resistance welding method.
Figure 4A:
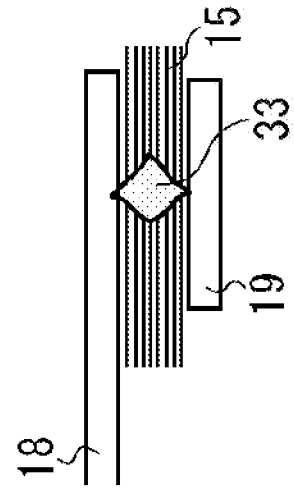
FIG. 4A is a sectional view showing the formation state of a nugget in Example 1.
Figure 4B:
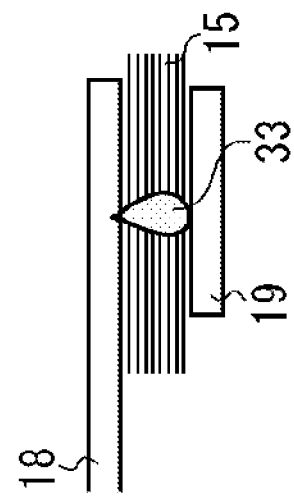
FIG. 4B and FIG. 4C are sectional views showing the formation state of a nugget in Comparative Example 1.
Figure 4C:
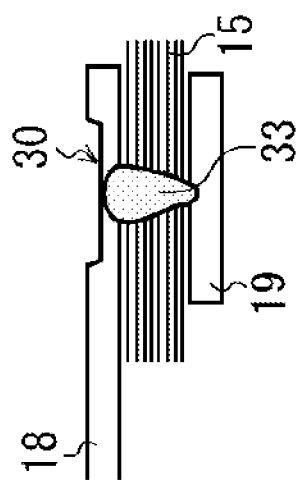

First, the specific configuration of a prismatic nonaqueous electrolyte secondary battery 10A common to Example 1 and Comparative Example 1 will be described using FIGS. 1 to 4. FIG. 1A is a front view showing the internal structure of a prismatic nonaqueous electrolyte secondary battery common to Example and Comparative Example 1, and FIG. 1B is a sectional view along line IB-IB in FIG. 1A. FIG. 2 is a sectional view of a portion along line II-II in FIG. 1A for illustrating a resistance welding method. FIG. 3A is a plan view of a negative electrode collector before bending in Example 1, FIG. 3B is a side view of the same, FIG. 3C is a plan view of a negative electrode collector receiving member, and FIG. 3D is a side view of the same. FIG. 4A is a sectional view showing the formation state of a nugget in Example 1, and FIGS. 4B and 4C are sectional views showing the formation state of a nugget in Comparative Example 1.

In the prismatic nonaqueous electrolyte secondary battery 10A, a flattened wound electrode assembly 11 in which a positive electrode plate and a negative electrode plate are wound with a separator therebetween (which are omitted in the drawing) is accommodated inside a prismatic battery outer can 12. The battery outer can 12 is hermetically sealed by a sealing body 13.

The flattened wound electrode assembly 11 includes positive electrode substrate exposed portions 14 and negative electrode substrate exposed portions 15, each of which has both end portions in the winding axis direction without a positive electrode mixture or a negative electrode mixture applied. The positive electrode substrate exposed portions 14 is connected to a positive electrode terminal 17 with a positive electrode collector 16 therebetween. The negative electrode substrate exposed portions 15 are connected to a negative electrode terminal 20 with a negative electrode collector 18 therebetween. The positive electrode terminal 17 and the negative electrode terminal 20 are fixed to the sealing body 13 with insulating members 21 and 22 therebetween, respectively.

The prismatic nonaqueous electrolyte secondary battery 10A is prepared by inserting the flattened wound electrode assembly 11 within the battery outer can 12; laser-welding the sealing body 13 to a mouth portion of the battery outer can 12; pouring a nonaqueous electrolyte from an electrolyte pour hole (not shown); and sealing the electrolyte pour hole. As the electrolyte, a nonaqueous electrolyte can be used in which, for example, $LiPF_6$ is dissolved to 1 mol/L in a solvent obtained by mixing ethylene carbonate and diethyl carbonate at a volume ratio of 3:7.

Next, a specific method of manufacturing the flattened wound electrode assembly 11 common to Example 1 and Comparative Example 1 will be described.

[Preparation of Positive Electrode Plate]

The positive electrode plate is prepared in the following manner. First, the following materials are mixed: 94% by mass of lithium cobalt oxide ($LiCoO_2$) powder as a positive electrode active material; 3% by mass of carbon-based powder such as acetylene black or graphite as a conductive agent; and 3% by mass of a binding agent formed of polyvinylidene fluoride (PVdF). An organic solvent containing N-methyl-2-pyrrolidone (NMP) is added to the resulting mixture. The mixture is kneaded to prepare a positive electrode active material mixture slurry. Next, a positive electrode substrate of an aluminum foil (having a thickness of 20 μm, for example) is prepared. The positive electrode active material mixture slurry prepared as above is applied uniformly to both surfaces of the positive electrode substrate to apply a positive electrode active material mixture layer. At this time, the application is performed such that a bare portion (positive electrode substrate exposed portion) of a particular width (12 mm herein) to which the positive electrode active material mixture slurry is not applied is formed on one side of the positive electrode active material mixture layer and along an edge of the positive electrode substrate. The positive electrode substrate formed with the positive electrode active material mixture layer is passed through a dryer to be dried with the NMP necessary at the time of slurry prepartion removed. After the drying, the positive electrode plate is prepared by rolling with a roll press machine until the thickness becomes 0.06 mm. The positive electrode plate thus prepared is cut out into a strip shape having a width of 100 mm, thereby obtaining a positive electrode plate provided with a band-shaped positive electrode substrate exposed portion of aluminum having a width of 10 mm.

[Preparation of Negative Electrode Plate]

The negative electrode plate is prepared in the following manner. First, the following materials are mixed: 98% by mass of natural graphite powder as a negative electrode active material; and 1% by mass each of carboxymethyl cellulose (CMC) and styrene-butadiene rubber (SBR) as a binding agent. Water is added to the resulting mixture. The mixture is kneaded to prepare a negative electrode active material mixture slurry. Next, a negative electrode substrate of a copper foil (having a thickness of 12 μm, for example) is prepared. The negative electrode active material mixture slurry prepared as above is applied uniformly to both surfaces of the negative electrode substrate to form a negative electrode active material mixture layer. At this time, the application is performed such that a bare portion (negative electrode substrate exposed portion) having a particular width (10 mm herein) to which the negative electrode active material mixture slurry is not applied is formed on one side of the negative electrode active material mixture layer and along an edge of the negative electrode substrate. The negative electrode substrate formed with the negative electrode active material mixture layer is passed through a dryer to be dried. After the drying, the negative electrode plate is prepared by rolling with a roll press machine until the thickness becomes 0.05 mm. The negative electrode plate thus prepared is cut out into a strip shape having a width of 110 mm, thereby obtaining a negative electrode plate provided with a band-shaped negative electrode substrate exposed portion having a width of 8 mm.

[Preparation of Wound Electrode Assembly]

The flattened wound electrode assembly 11 used in Example 1 and Comparative Example 1 having both sides formed with the positive electrode substrate exposed portions 14 of a plurality of aluminum foils and the negative electrode substrate exposed portions 15 of a plurality of copper foils is prepared by winding the positive electrode plate and the negative electrode plate obtained as above with a porous separator of polyethylene (having a thickness of 0.022 mm and a width of 100 mm) interposed therebetween while being displaced such that the positive electrode substrate exposed portions of the positive electrode plate and the negative electrode substrate exposed portions of the negative electrode plate each do not overlap with the active material mixture layer of the facing electrode. The total number of layers of the wound electrode assembly 11 is 88.

[Resistance Welding of Collectors]

To the positive electrode substrate exposed portions 14 of the flattened wound electrode assembly 11 thus prepared, the positive electrode collector 16 and a positive electrode collector receiving member (omitted in the drawing) of aluminum are attached by resistance welding. The negative electrode collector 18 and a negative electrode collector receiving member 19 of copper are attached to the negative electrode substrate exposed portions 15 by resistance welding in the same manner.

In the case where the negative electrode collector 18 and the negative electrode collector receiving member 19 of copper are attached to the negative electrode substrate exposed portions 15 by resistance welding, the negative electrode collector receiving member 19 is placed on a resistance welding electrode bar 23 fixed on the lower side, and the negative electrode collector 18 is further placed such that the negative electrode substrate exposed portions 15 are interposed between the negative electrode collector receiving member 19 and the negative electrode collector 18, as shown in FIG. 2. Next, a resistance welding electrode bar 23 on the upper side is arranged on the negative electrode collector 18 and pressed toward the negative electrode collector 18 side with a particular pressure experimentally set in advance, and a particular resistance welding current is caused to flow, thereby performing resistance welding.

FIGS. 2 and 3 show an example using the negative electrode collector 18 corresponding to Example 1 provided with a recess portion 30. In contrast, the negative electrode collector 18 corresponding to Comparative Example 1 has no recess portion 30. The negative electrode collector 18 and the negative electrode collector receiving member 19 in Example 1 and Comparative Example 1 are prepared by punching out a copper plate having a thickness of 0.8 mm into a width of 7 mm except at a connecting portion with the negative electrode terminal 20 and bending, as shown in FIG. 3. The negative electrode collector 18 and the negative electrode collector receiving member 19 are formed with ribs 31 and 32, respectively, at resistance welding portions.

After the negative electrode collector 18 and the negative electrode collector receiving member 19 of copper are attached to the negative electrode substrate exposed portions 15 by resistance welding in this manner, the positive electrode collector 16 and the positive electrode collector receiving member are attached additionally to the positive electrode substrate exposed portions 14. The prismatic nonaqueous electrolyte secondary battery 10A as a prismatic secondary battery is then assembled in a manner described above.

A tension test and disassembly of a welding portion were performed to check the strength of the welding portion and the generation state of a nugget through resistance welding performed at five points each for a case (Example 1) where the negative electrode collector 18 had the recess portion 30 of the present invention on the side not facing the negative electrode substrate exposed portions and another case (Comparative Example 1) where no recess portion 30 was formed. The plan view and side view of the negative electrode collector 18 used in Example 1 and Comparative Example 1 are as shown in FIGS. 3A and 3B, respectively. The shape of the negative electrode collector receiving member 19 was as shown in FIG. 3C, and the thicknesses were all 0.8 mm. The thickness of a thin portion of the recess portion 30 in Example 1 was 0.6 mm. The negative electrode collector 18 in Comparative Example 1 had no recess portion 30.

[Tension Test]

The tension test was performed in the following manner. First, the ribs 31 and 32 of the negative electrode collector 18 and the negative electrode collector receiving member 19 in the vicinity of the welding portion were grabbed, and the negative electrode collector 18 was pulled in a 180° direction with respect to the negative electrode substrate exposed portions 15 until the resistance welding portion came off (broke). Subsequently, it was visually checked whether a hole was made in the thin portion of the recess portion 30 of the negative electrode collector 18. Sufficient resistance welding leads to a favorable nugget 33 formed between the negative electrode collector 18 and the negative electrode substrate exposed portions 15. Therefore, when the tension test is performed, a hole is made in the thin portion, where the strength is low, of the recess portion 30 of the negative electrode collector 18. Insufficient welding does not lead to a favorable nugget formed between the negative electrode collector 18 and the negative electrode substrate exposed portions 15, but leads to the state close to that of pressure welding. Therefore, a hole is not made in the negative electrode collector 18 because the negative electrode collector 18 and the negative electrode substrate exposed portions 15 are peeled off from each other at their boundary or within the negative electrode substrate exposed portions 15.

According to the result of the tension tests, a hole was made in the thin portion of the recess portion 30 of the negative electrode collector 18 in all batteries for Example 1. In contrast, no hole was made in the negative electrode collector 18 and the negative electrode collector 18 and the negative electrode substrate exposed portions 15 are peeled off from each other at their boundary or within the negative electrode substrate exposed portions 15 in all batteries for Comparative Example 1.

[Checking of Generation State of Nugget]

In the case of Example 1, the large nugget 33 was formed on the negative electrode collector 18 side, as shown in FIG. 4A, in all five examples of the formation state of the nugget. In contrast, in the case of Comparative Example 1, the large nugget 33 was formed inside the negative electrode substrate exposed portions 15 (see FIG. 4B) or on the negative electrode collector receiving member 19 side, as shown in FIG. 4B or 4C.

This appears to show that, when the recess portion 30 is formed and resistance welding is performed in a portion of the recess portion 30 as in the negative electrode collector 18 of Example 1, the portion of the recess portion 30 generates heat and melts in a favorable manner at the time of resistance welding since the thickness of the portion of the recess portion 30 is smaller than the thickness of the other portions, and therefore a large nugget is formed on the recess portion 30 side. In contrast, in the case of Comparative Example 1, it appears that the nugget 33 was formed inside the negative electrode substrate exposed portions 15 (see FIG. 4B) since the negative electrode collector 18 and the negative electrode collector receiving member 19 both have a large thickness and both do not generate heat in a favorable manner at the time of resistance welding, or the large nugget 33 was formed on the negative electrode collector receiving member 19 side (see FIG. 4C) since the negative electrode collector receiving member 19 has a heat capacity lower than that of the negative electrode collector 18.

Example 2 and Comparative Example 2

Figure 5B:
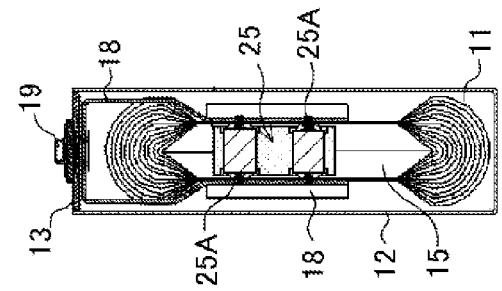
FIG. 5B is a sectional view along line VB-VB in FIG. 5A.
Figure 5A:
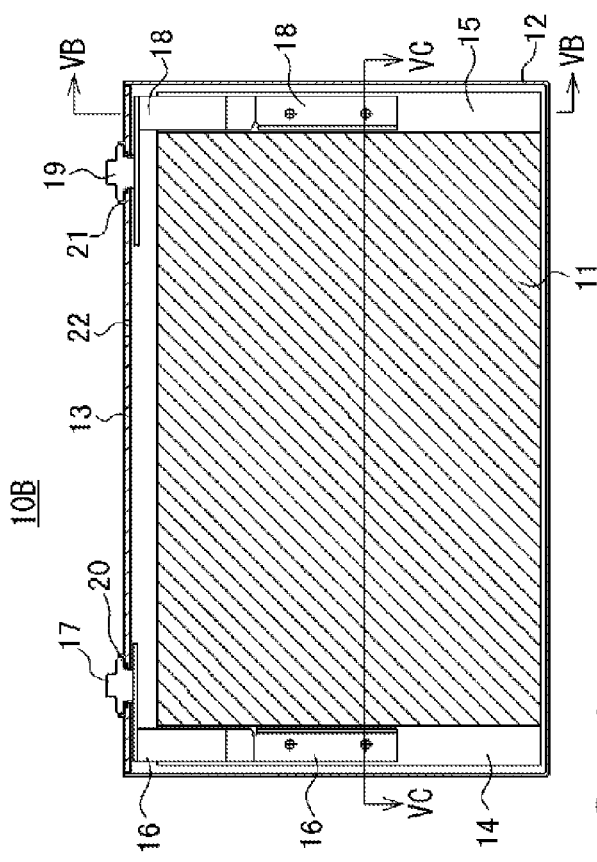
FIG. 5A is a sectional view of a prismatic nonaqueous electrolyte secondary battery according to Example 2 and Comparative Example 2.
Figure 5C:
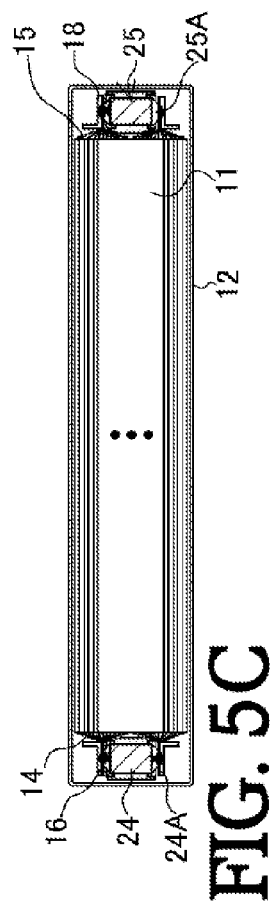
FIG. 5C is a sectional view along line VC-VC in FIG. 5A.
Figure 7C:
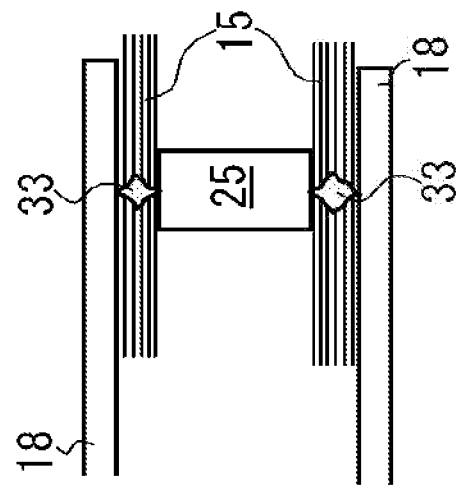
FIGS. 7B and 7C are sectional views showing the formation state of a nugget in Comparative Example 2.
Figure 7B:
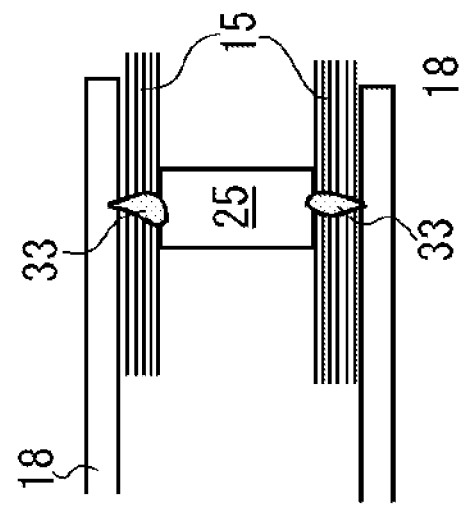
Figure 7A:
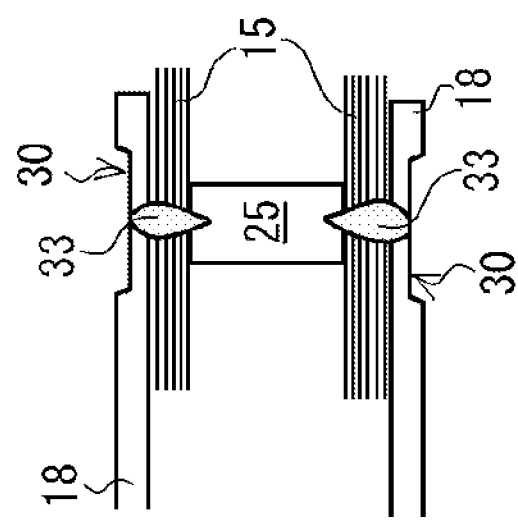
FIG. 7A is a sectional view showing the formation state of a nugget in Example 2.
Figure 9:
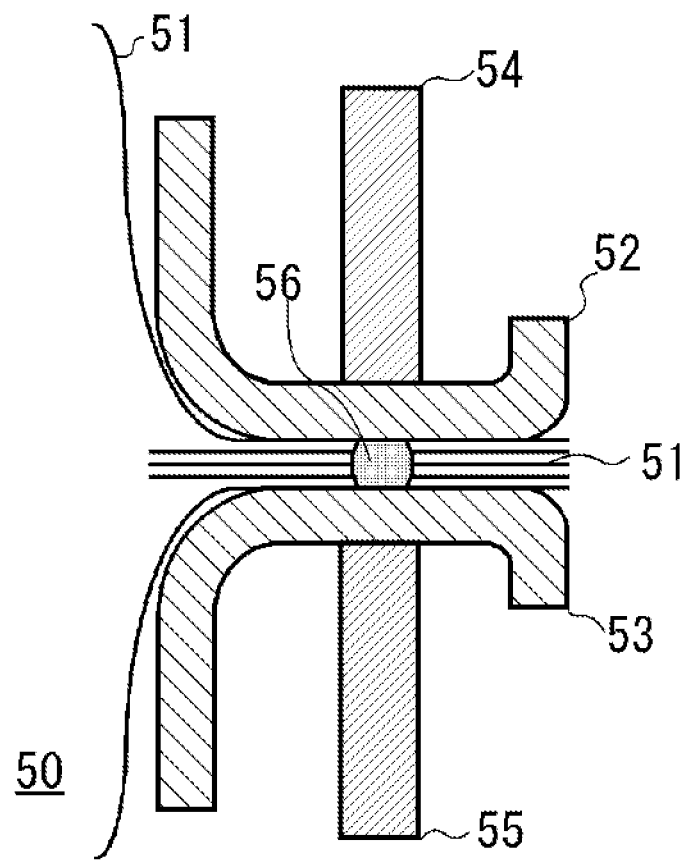
FIG. 9 is a sectional view illustrating a resistance welding method for a collector in a prismatic secondary battery of the related art.
Figure 10B:
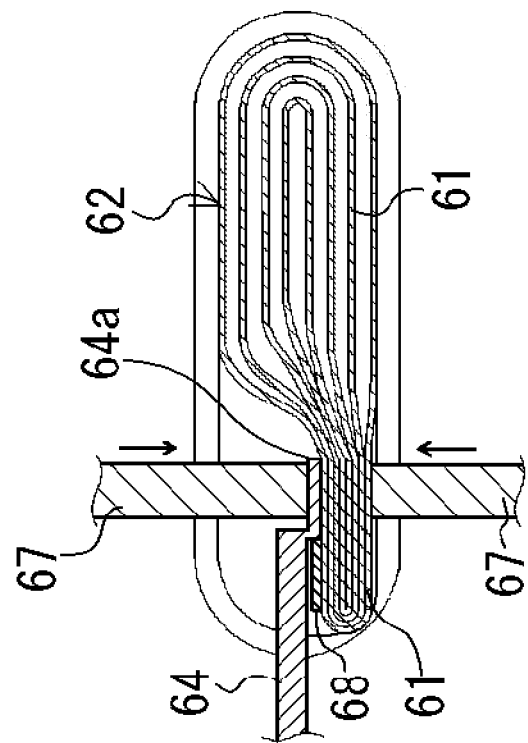
FIG. 10B is a vertical sectional view of the same at the time of resistance welding.
Figure 10A:
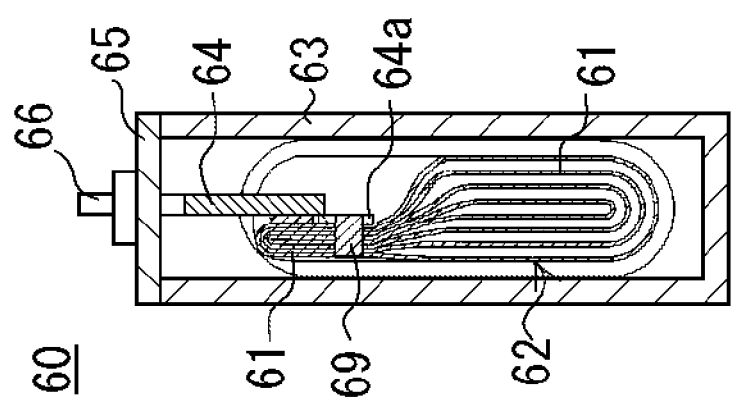
FIG. 10A is a vertical sectional view of a terminal portion in a prismatic secondary battery of the related art.
Figure 11A:
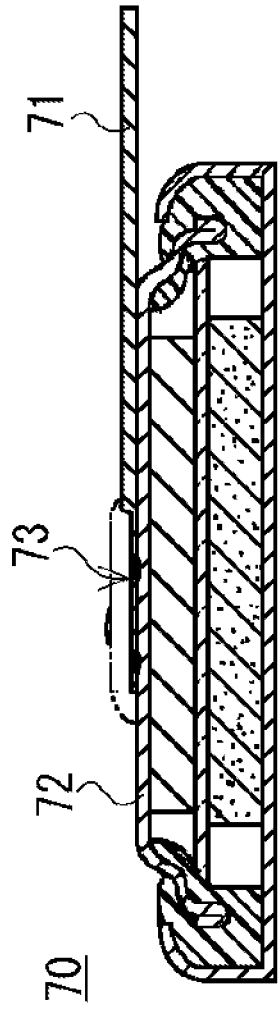
FIG. 11A is a perspective view of a flattened battery with a lead terminal of the related art.
Figure 11C:
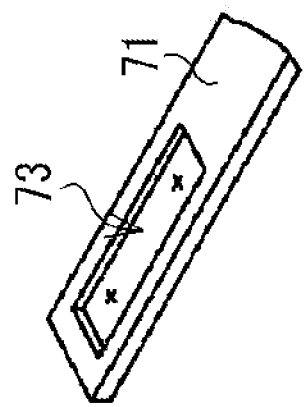
FIG. 11C is a perspective view of a second specific example of the same.
Figure 11B:
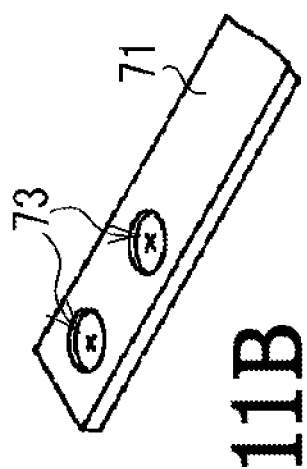
FIG. 11B is a perspective view of a first specific example of the lead terminal.

Next, the specific configuration of a prismatic nonaqueous electrolyte secondary battery 10B common to Example 2 and Comparative Example 2 will be described using FIGS. 5 to 7. FIG. 5A is a sectional view of the nonaqueous electrolyte secondary battery according to Example 2 and Comparative Example 2, FIG. 5B is a sectional view along line VB-VB in FIG. 5A, and FIG. 5C is a sectional view along line VC-VC in FIG. 5A. FIG. 6A is a plan view of a negative electrode collector before bending in Example 2, FIG. 6B is a side view of the same, and FIG. 6C is a plan view of a negative electrode conductive member. FIG. 7A is a sectional view showing the formation state of a nugget in Example 2, and FIGS. 7B and 7C are sectional views showing the formation state of a nugget in Comparative Example 2. In FIGS. 5 to 7, components that are the same as in the prismatic nonaqueous electrolyte secondary battery 10A common to Example 1 and Comparative Example 1 are denoted by and described with the same reference numerals.

In the flattened wound electrode assembly 11 common to Example 2 and Comparative Example 2, as shown in FIGS. 5B and 5C, a plurality of the stacked positive electrode substrate exposed portions 14 are divided into two groups on the positive electrode plate side and hold therebetween a positive electrode intermediate member 24 containing a resin material. The positive electrode intermediate member 24 holds two positive electrode conductive members 24A. A plurality of the stacked negative electrode substrate exposed portions 15 are divided into two groups in the same manner on the negative electrode plate side and hold therebetween a negative electrode intermediate member 25 containing a resin material. The negative electrode intermediate member 25 holds two negative electrode conductive members 25A. In addition, the positive electrode collector 16 is arranged on respective surfaces on both sides on the outermost side of the positive electrode substrate exposed portions 14 located on both sides of the positive electrode conductive member 24A. The negative electrode collector 18 is arranged on respective surfaces on both sides on the outermost side of the negative electrode substrate exposed portions 15 located on both sides of the negative electrode intermediate member 25.

In the prismatic nonaqueous electrolyte secondary battery 10B common to Example 2 and Comparative Example 2, the positive electrode conductive member 24A used contains aluminum that is the same material as for the positive electrode substrate, and the negative electrode conductive member 25A used contains copper that is the same material as for the negative electrode substrate. The shapes of the positive electrode conductive member 24A and the negative electrode conductive member 25A may be the same or different. A resin material of polypropylene (PP) is used in the positive electrode intermediate member 24 and the negative electrode intermediate member 25.

Resistance welding is performed both between the negative electrode collector 18 and the negative electrode substrate exposed portions 15 and between the negative electrode substrate exposed portions 15 and the negative electrode conductive member 25A (at four points each, see FIG. 5B). Resistance welding is performed for connections both between the positive electrode collector 16 and the positive electrode substrate exposed portions 14 and between the positive electrode substrate exposed portions 14 and the positive electrode conductive member 24A (at four points each).

A specific manufacturing method of the flattened wound electrode assembly 11 common to Example 2 and Comparative Example 2 and a resistance welding method using respective substrate exposed portions, collectors, and intermediate members including respective conductive members will be described below with those on the negative electrode side as an illustration.

First, the positive electrode plate and the negative electrode plate prepared in a similar manner as in the case of Example 1 and Comparative Example 1 are wound with a porous separator containing polyethylene interposed therebetween while being displaced such that an aluminum foil exposed portion of the positive electrode plate and a copper foil exposed portion of the negative electrode plate each do not overlap with an active material layer of the facing electrode. The negative electrode substrate exposed portions 15 of the resulting flattened wound electrode assembly 11 are divided into two groups from the winding center portion outward to the two sides, and each group is bunched around the center that is the line along ¼ of the thickness of the electrode away from the outer surface of the electrode. Here, each bunch of copper foil has a thickness of about 530 μm and 44 stacked substrates (for a total of 88). As shown in FIG. 6A, the negative electrode collector 18 is prepared by punching out a copper plate having a thickness of 0.8 mm into a width of 7 mm except at a connecting portion with the negative electrode terminal 20 and by bending. The negative electrode collector 18 is formed with the ribs 31 and 32 at respective resistance welding portions.

The negative electrode collector 18 in Example 2 has the recess portion 30 at resistance welding portions (four points) on the side not facing the negative electrode substrate exposed portions 15. The thickness of the recess portion is 0.6 mm. The negative electrode collector 18 in Comparative Example 2 has no recess portion 30. The negative electrode collector 18 is arranged on both surfaces on the outermost circumference side of the negative electrode substrate exposed portions 15. The negative electrode intermediate member 25 including the negative electrode conductive member 25A is inserted between the two bunches of the negative electrode substrate exposed portions 15 on the inner circumference side of the negative electrode substrate exposed portions 15 such that both ends of the negative electrode conductive member 25A each are in abutment with the negative electrode substrate exposed portions 15.

Here, the shape of the negative electrode conductive member 25A held by the negative electrode intermediate member 25 common to Example 2 and Comparative Example 2 will be described using FIG. 6C. The negative electrode conductive member 25A has a cylindrical shape in which a truncated-cone-shaped projection 25B is formed at each of both ends. At the tip end of the projection 25B, a recess portion is formed. The height of the truncated-cone-shaped projection 25B is 1 mm that is approximately the same as the height of a projection generally formed in a resistance welding member. However, the projection 25B is not always a necessary component. The diameter and length of the negative electrode conductive member 25A vary depending on the size of the flattened wound electrode assembly 11 or the battery outer can 12 (see FIG. 5). The negative electrode conductive member 25A used here have a diameter Ø at a cylindrical portion of 5 mm and a length of 9 mm.

Two negative electrode conductive members 25A common to Example 2 and Comparative Example 2 are integrally held with a resin material as the negative electrode intermediate member 25. In this case, the negative electrode conductive members 25A are held to be parallel to each other. The shape of the negative electrode intermediate member 25 may be any desired shape such as a prismatic shape or a cylindrical shape. The negative electrode intermediate member 25 used here has a wide prismatic shape for a stable positioning and fixation within the divided negative electrode substrate exposed portions 15. The prism-shaped negative electrode intermediate member 25 used here has a length of 30 mm and a width of 7 mm.

A tension test and disassembly of a welding portion were performed to check the strength of the welding portion and the generation state of a nugget through resistance welding performed at five points each for a case (Example 2) where a pair of resistance welding electrode bars were brought into abutment with a pair of parts of the negative electrode collector 18 on the outermost side and the negative electrode collector 18 on both sides had the recess portion 30 of the present invention on the side not facing the negative electrode substrate exposed portions 15 and another case (Comparative Example 2) where no recess portion 30 was formed, in a similar manner to the resistance welding method in Example 1 and Comparative Example 1 shown in FIG. 2. In the resistance welding here, the negative electrode intermediate member 25 was arranged in a stably positioned state between the two bunches of the negative electrode substrate exposed portions 15. Thus, resistance welding was first performed in a negative electrode conductive member 25A portion on the sealing body 13 (see FIG. 5A) side of the prismatic nonaqueous electrolyte secondary battery 10B, and then resistance welding was performed in another negative electrode conductive member 25A portion, using only one set of the pair of resistance welding electrode bars.

[Tension Test]

The tension test was performed in a similar manner as in the case of Example 1 and Comparative Example 1. First, the ribs 31 and 32 of the negative electrode collector 18 on both sides in the vicinity of the welding portion were grabbed, and the negative electrode collector 18 was pulled in a 180° direction with respect to the negative electrode substrate exposed portions 15 until the resistance welding portion came off (broke). Subsequently, it was visually checked whether a hole was made in a thin portion of the recess portion 30 of the negative electrode collector 18. According to the result of the tension tests, a hole was made in the thin portion of the recess portion 30 of the negative electrode collector 18 in all batteries in Example 2. In contrast, no hole was made in the negative electrode collector 18 and the negative electrode collector 18 and the negative electrode substrate exposed portions 15 are peeled off from each other at their boundary or within the negative electrode substrate exposed portions 15 in all batteries in Comparative Example 2.

[Checking of Generation State of Nugget]

In the case of Example 2, the large nugget 33 was formed on the negative electrode collector 18 side on both sides, as shown in FIG. 7A, in all five examples of the formation state of the nugget. In contrast, in the case of Comparative Example 2, the large nugget 33 was formed on the negative electrode conductive member 25A side of the negative electrode substrate exposed portions 15, as shown in FIG. 7B.

This appears to show that, when the recess portion 30 is formed and resistance welding is performed in a portion of the recess portion 30 as in the negative electrode collector 18 of Example 2, the thin portion of the recess portion 30 generates heat and melts in a favorable manner at the time of resistance welding since the thickness of the thin portion of the recess portion 30 is smaller than the thickness of the other portions, and therefore a large nugget is formed on the recess portion 30 side. In contrast, in the case of Comparative Example 2, it appears that the large nugget 33 is formed on the negative electrode conductive member 25A side since the thickness of the negative electrode collector 18 is large and the projections 25B that act as a projection are formed at both ends of the negative electrode conductive member 25A, thus causing great heat generation on the projection 25B side. In the case where the projections 25B are not formed at both ends of the negative electrode conductive member 25A in Comparative Example 2, the nugget 33 is more often formed inside the negative electrode substrate exposed portions 15, as shown in FIG. 7C, since the negative electrode collector 18 and the negative electrode conductive member 25A both do not generate heat in a favorable manner at the time of resistance welding.

Example 3 and Comparative Example 3

Next, the formation state of a nugget of a prismatic nonaqueous electrolyte secondary battery common to Example 3 and Comparative Example 3 will be described using FIG. 8. FIG. 8A is a sectional view showing the formation state of the nugget in Example 3, and FIGS. 8B and 8C are sectional views showing the formation state of the nugget in Comparative Example 3.

In the prismatic nonaqueous electrolyte secondary battery 10B common to Example 2 and Comparative Example 2, the parts of the negative electrode collector 18 are arranged on both sides at an outermost portion of the negative electrode substrate exposed portions 15; in the nonaqueous electrolyte secondary battery common to Example 3 and Comparative Example 3, the negative electrode collector 18 is arranged on one side and the negative electrode collector receiving member 19 is arranged on the other side, which is the only difference. Therefore, a specific drawing thereof is omitted. The negative electrode collector 18 and the negative electrode collector receiving member 19 used in Example 3 have configurations similar to those used in Example 1, except that a recess portion 30a is formed in the negative electrode collector receiving member 19 in addition to the recess portion 30 being formed in the negative electrode collector 18. In Comparative Example 3, no recess portion 30 is formed in the negative electrode collector 18 or the collector receiving member 19.

A tension test and disassembly of a welding portion were performed to check the weld strength and the generation state of a nugget through resistance welding performed for five points each for a case (Example 3) where a pair of resistance welding electrode bars were brought in abutment with the negative electrode collector 18 and the negative electrode collector receiving member 19 on the outermost side and the negative electrode collector 18 and the negative electrode collector receiving member 19 had the recess portions 30 and 30a of the present invention and another case (Comparative Example 3) where no recess portion was formed in the prismatic nonaqueous electrolyte secondary battery common to Example 3 and Comparative Example 3, in a similar manner to the resistance welding method in Example 1 and Comparative Example 1 shown in FIG. 2. In the resistance welding here, the negative electrode intermediate member 25 was arranged in a stably positioned state between the two bunches of the negative electrode substrate exposed portions 15. Thus, resistance welding was first performed in a negative electrode conductive member 25A portion on the sealing body 13 (see FIG. 5A) side of the prismatic nonaqueous electrolyte secondary battery 10B, and then resistance welding was performed in another negative electrode conductive member 25A portion, using only one set of the pair of resistance welding electrode bars.

[Tension Test]

The tension test was performed for the nonaqueous electrolyte secondary battery in Example 3 and Comparative Example 3 in a similar manner as in the case of Example 1 and Comparative Example 1. First, the rib 31 of the negative electrode collector 18 and the rib 32 of the negative electrode collector receiving member 19 in the vicinity of the welding portion were grabbed, and the negative electrode collector 18 was pulled in a 180° direction with respect to the negative electrode substrate exposed portions 15 until the resistance welding portion came off (broke). Subsequently, it was visually checked whether a hole was made in a thin portion of the recess portion 30 or 30a of the negative electrode collector 18 or the negative electrode collector receiving member 19. According to the result of the tension tests, a hole was made in the thin portion of the recess portions 30 and 30a of the negative electrode collector 18 and the negative electrode collector receiving member 19 in all batteries in Example 3. In contrast, no hole was made in the negative electrode collector 18 and the negative electrode collector receiving member 19 and the negative electrode collector 18 or negative electrode collector receiving member 19 and the negative electrode substrate exposed portions 15 are peeled off from each other at their boundary or within the negative electrode substrate exposed portions 15 in all batteries in Comparative Example 3.

[Checking of Generation State of Nugget]

In the case of Example 3, the large nuggets 33 were formed on the negative electrode collector 18 side and on the negative electrode collector receiving member 19 side, as shown in FIG. 8A, in all five examples of the formation state of the nugget. In contrast, in the case of Comparative Example 2, the large nugget 33 was formed on the negative electrode conductive member 25A side of the negative electrode substrate exposed portions 15, as shown in FIG. 8B.

This appears to show that, when the recess portions 30 and 30a are each formed on the side not facing the negative electrode substrate exposed portions 15 and resistance welding is performed in a portion of the recess portions 30 and 30a as in the negative electrode collector 18 and the negative electrode collector receiving member 19 of Example 3, the thin portion of the recess portions 30 and 30a generates heat and melts in a favorable manner at the time of resistance welding since the thickness of the thin portion of the recess portions 30 and 30a is smaller than the thickness of the other portions, and therefore a large nugget is formed on the recess portion 30 or 30a side. In contrast, in the case of Comparative Example 3, it appears that the large nugget 33 is formed on the negative electrode conductive member 25A side since the thickness of the negative electrode collector 18 and the negative electrode collector receiving member 19 are large and the projections 25B acting as a projection are formed at both ends of the negative electrode conductive member 25A, thus causing great heat generation on the projection 25B side. In the case where the projection 25B is not formed at both ends of the negative electrode conductive member 25A in Comparative Example 3, the nugget 33 is more often formed inside the negative electrode substrate exposed portions 15, as shown in FIG. 8C, since the negative electrode collector 18 and the negative electrode conductive member 25A both do not generate heat in a favorable manner at the time of resistance welding.

An example in which the recess portion 30a is provided to the negative electrode collector receiving member 19 has been shown in Example 3. If the negative electrode collector receiving member 19 is not formed with a recess portion on the side not facing the negative electrode substrate exposed portions 15, a large nugget is formed on the collector side. This increases the weld strength between the negative electrode collector or positive electrode collector and the negative electrode substrate exposed portions or positive electrode substrate exposed portions, and reduces the electrical resistance. Thus, a reduction in output at the time a large current discharge is decreased.

The negative electrode side has been described in Examples 1 to 3 and Comparative Examples 1 to 3 described above. Substantially similar effects are obtained also on the positive electrode side by employing a similar configuration except for the material for the positive electrode substrate exposed portions 14, the positive electrode collector 16, the positive electrode intermediate member 24, the positive electrode conductive member 24A, and the positive electrode collector receiving member (omitted in the drawing). The present invention does not necessarily need to be employed for both the negative electrode side and the positive electrode side, and may be applied to only one of the negative electrode side and the positive electrode side. Furthermore, an insulating film may be arranged between the substrate exposed portions and the collector or collector receiving member except at the resistance welding portion. The collector or collector receiving member may be formed with a projection on the side facing the substrate exposed portions.

EXPLANATIONS OF LETTERS OR NUMERALS 10A, 10B: Prismatic nonaqueous electrolyte secondary battery, 11: Wound electrode assembly, 12: Battery outer can, 13: Sealing body, 14: Positive electrode substrate exposed portions, 15: Negative electrode substrate exposed portions, 16: Positive electrode collector, 17: Positive electrode terminal, 18: Negative electrode collector, 19: Negative electrode collector receiving member, 20: Negative electrode terminal, 21, 22: Insulating member, 23: Resistance welding electrode bar, 24: Positive electrode intermediate member, 24A: Positive electrode conductive member, 25: Negative electrode intermediate member, 25A: Negative electrode conductive member, 25B: Projection, 30, 30a: Recess portion, 31, 32: Rib, 33: Nugget

The invention claimed is:

1. A prismatic secondary battery comprising:
an electrode assembly including stacked or wound negative electrode substrate exposed portions and positive electrode substrate exposed portions;
a negative electrode collector and a positive electrode collector electrically connected to the negative electrode substrate exposed portions and the positive electrode substrate exposed portions, respectively; and
a negative electrode terminal and a positive electrode terminal electrically connected to the negative electrode collector and the positive electrode collector, respectively,
at least one of the negative electrode substrate exposed portions and/or the positive electrode substrate exposed portions being connected to one surface with the negative electrode collector and/or the positive electrode collector, respectively, and being connected at another surface with a negative electrode collector receiving member or a positive electrode collector receiving member, and at least one of the negative electrode collector and the positive electrode collector being made of metal and having a recess portion formed in part on a surface on the side not facing the negative electrode substrate exposed portions or the positive electrode substrate exposed portions in a region facing the negative electrode substrate exposed portions or the positive electrode substrate exposed portions, the thickness of the recess portion being formed to be smaller than the thickness of the other metal portions of the negative electrode collector or the positive electrode collector, and resistance welding being carried out in the recess portion, and wherein the recess portion comprises a bottom and a side wall standing from the bottom.

2. The prismatic secondary battery according to claim 1, wherein the thickness of the recess portion is smaller than the thickness of the negative electrode collector receiving member or the positive electrode collector receiving member.

3. A prismatic secondary battery comprising:

an electrode assembly including stacked or wound negative electrode substrate exposed portions and positive electrode substrate exposed portions;

a negative electrode collector and a positive electrode collector electrically connected to the negative electrode substrate exposed portions and the positive electrode substrate exposed portions, respectively; and a negative electrode terminal and a positive electrode terminal electrically connected to the negative electrode collector and the positive electrode collector, respectively, at least one of the negative electrode collector and the positive electrode collector being formed integrally and arranged on both surfaces of the negative electrode substrate exposed portions or the positive electrode substrate exposed portions, and at least one of the negative electrode collector and the positive electrode collector being made of metal and having a recess portion formed on both surfaces on the side not facing the negative electrode substrate exposed portions or the positive electrode substrate exposed portions in a region facing the negative electrode substrate exposed portions or the positive electrode substrate exposed portions, the thickness of the recess portion being formed to be smaller than the thickness of the other metal portions of the negative electrode collector or the positive electrode collector, and resistance welding being carried out in the recess portion, and wherein the recess portion comprises a bottom and a side wall standing from the bottom.

4. The prismatic secondary battery according to claim 3, wherein at least one of the negative electrode substrate exposed portions and the positive electrode substrate exposed portions is divided into two groups with an intermediate member including at least one conductive member arranged therebetween, and the collector on the divided substrate exposed portion side is arranged on both surfaces on the outermost side of the divided substrate exposed portions.

5. The prismatic secondary battery according to claim 4, wherein the conductive member of the intermediate member is formed with a projection on the side that contacts the negative electrode substrate exposed portions or the positive electrode substrate exposed portions.

6. The prismatic secondary battery according to claim 1, wherein the bottom and side wall of the recess portion comprise aluminum, aluminum alloy, copper, or copper alloy.

7. The prismatic secondary battery according to claim 1,
wherein the recess portion comprises a plurality of recess portions comprising a first recess portion and a second recess portion,
wherein the first recess portion and the second recess portion are disposed linearly, and
wherein the at least one of the negative electrode collector and the positive electrode collector has a region between the first recess portion and the second recess portion which has a thickness thicker than that of both of the first recess portion and the second recess portion.

8. The prismatic secondary battery according to claim 1, wherein the bottom and the side wall of the recess portion form an obtuse angle.

9. The prismatic secondary battery according to claim 1, wherein the recess portion has a rectangular shape in a planar view.

10. The prismatic secondary battery according to claim 1, wherein the recess portion extends to one edge of the at least one of the negative electrode collector and the positive electrode collector in a width direction of the at least one the negative electrode collector and the positive electrode collector.

11. The prismatic secondary battery according to claim 3, wherein the bottom and side wall of the recess portion comprise aluminum, aluminum alloy, copper, or copper alloy.

12. The prismatic secondary battery according to claim 3,
wherein the recess portion comprises a plurality of recess portions comprising a first recess portion and a second recess portion,
wherein the first recess portion and the second recess portion are disposed linearly, and
wherein the at least one of the negative electrode collector and the positive electrode collector has a region between the first recess portion and the second recess portion which has a thickness thicker than that of both of the first recess portion and the second recess portion.

13. The prismatic secondary battery according to claim 3, wherein the bottom and the side wall of the recess portion form an obtuse angle.

14. The prismatic secondary battery according to claim 3, wherein the recess portion has a rectangular shape in a planar view.

15. The prismatic secondary battery according to claim 3, wherein the recess portion extends to one edge of the at least one of the negative electrode collector and the positive electrode collector in a width direction of the at least one the negative electrode collector and the positive electrode collector.

16. The prismatic secondary battery according to claim 3, further comprising a sealing body having a short side and a long side,
wherein the at least one of the positive electrode collector and the negative electrode collector comprising the recess portion comprises:
a first region disposed in a parallel direction to the sealing body,
a second region standing substantially perpendicularly from one end of the first region in a short side direction of the sealing body, and extending to the electrode assembly, a third region adjacent to the second region, on an opposite side of the second region as the first region, a fourth region standing substantially perpendicularly from the other end of the first region in the short side direction of the sealing body, and extending to the electrode assembly, and a fifth region adjacent to the fourth region, on an opposite side of the fourth region as the first region, wherein a distance between the second region and the fourth region is greater than a distance between the third region and the fifth region, and wherein the recess portion is formed in each of the third region and the fifth region.

\* \* \* \* \*